(12) United States Patent
Skubacz et al.

(10) Patent No.: US 8,442,073 B2
(45) Date of Patent: May 14, 2013

(54) METHOD AND AN APPARATUS FOR ANALYZING A COMMUNICATION NETWORK

(75) Inventors: Michal Skubacz, Gröbenzell (DE); Maximilian Viermetz, München (DE)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 12/068,561

(22) Filed: Feb. 7, 2008

(65) Prior Publication Data
US 2009/0109872 A1    Apr. 30, 2009

(30) Foreign Application Priority Data
Oct. 25, 2007   (EP) .................................. 07020951

(51) Int. Cl.
H04J 3/24   (2006.01)
(52) U.S. Cl.
USPC ............................ 370/474; 370/254; 370/389
(58) Field of Classification Search .................... 370/254
See application file for complete search history.

(56) References Cited

U.S. PATENT DOCUMENTS

| | | | | |
|---|---|---|---|---|
| 6,859,807 B1 * | 2/2005 | Knight et al. | ............................ | 1/1 |
| 7,933,843 B1 * | 4/2011 | von Groll et al. | ............. | 705/319 |
| 2004/0117448 A1 * | 6/2004 | Newman et al. | ............... | 709/206 |
| 2005/0207390 A1 * | 9/2005 | Soheili et al. | .................. | 370/349 |
| 2006/0047497 A1 * | 3/2006 | Chen et al. | ......................... | 704/1 |
| 2007/0179945 A1 * | 8/2007 | Marston et al. | .................... | 707/5 |
| 2008/0082671 A1 * | 4/2008 | Meijer et al. | ..................... | 709/228 |
| 2008/0092182 A1 * | 4/2008 | Conant | ......................... | 725/109 |
| 2008/0114737 A1 * | 5/2008 | Neely et al. | ....................... | 707/3 |
| 2008/0162643 A1 * | 7/2008 | Flach | ............................. | 709/206 |
| 2008/0162860 A1 * | 7/2008 | Sabbatini et al. | ............. | 711/170 |
| 2008/0310310 A1 * | 12/2008 | Asher | ........................... | 370/238 |
| 2008/0317028 A1 * | 12/2008 | Chockler et al. | .............. | 370/390 |
| 2009/0016538 A1 * | 1/2009 | Drudis et al. | ................. | 380/279 |
| 2009/0027392 A1 * | 1/2009 | Jadhav et al. | ................. | 345/440 |
| 2009/0138565 A1 * | 5/2009 | Shiff et al. | .................... | 709/206 |

* cited by examiner

*Primary Examiner* — Duc C Ho
(74) *Attorney, Agent, or Firm* — Staas & Halsey LLP

(57) ABSTRACT

The invention provides a novel method and apparatus for analyzing a communication network such as a computer network or a social network comprising nodes communicating with each other by means of messages. A topic discovery unit is provided for performing a topic discovery on the basis of a message content which can be formed by textual content. A segmentation unit performs a segmentation of a global network graph representing the communication network into topic sub-graphs depending on the discovered topics. A property calculation unit calculates intra-topic network properties and inter-topic network properties of the network nodes. An advantage is that a deeper understanding of the analyzed communication network can be achieved such as communications patterns to identify roles of participating nodes. The method and apparatus according to the present invention can be used to optimize the organization of any communication network.

21 Claims, 8 Drawing Sheets

Message m

FIG 5
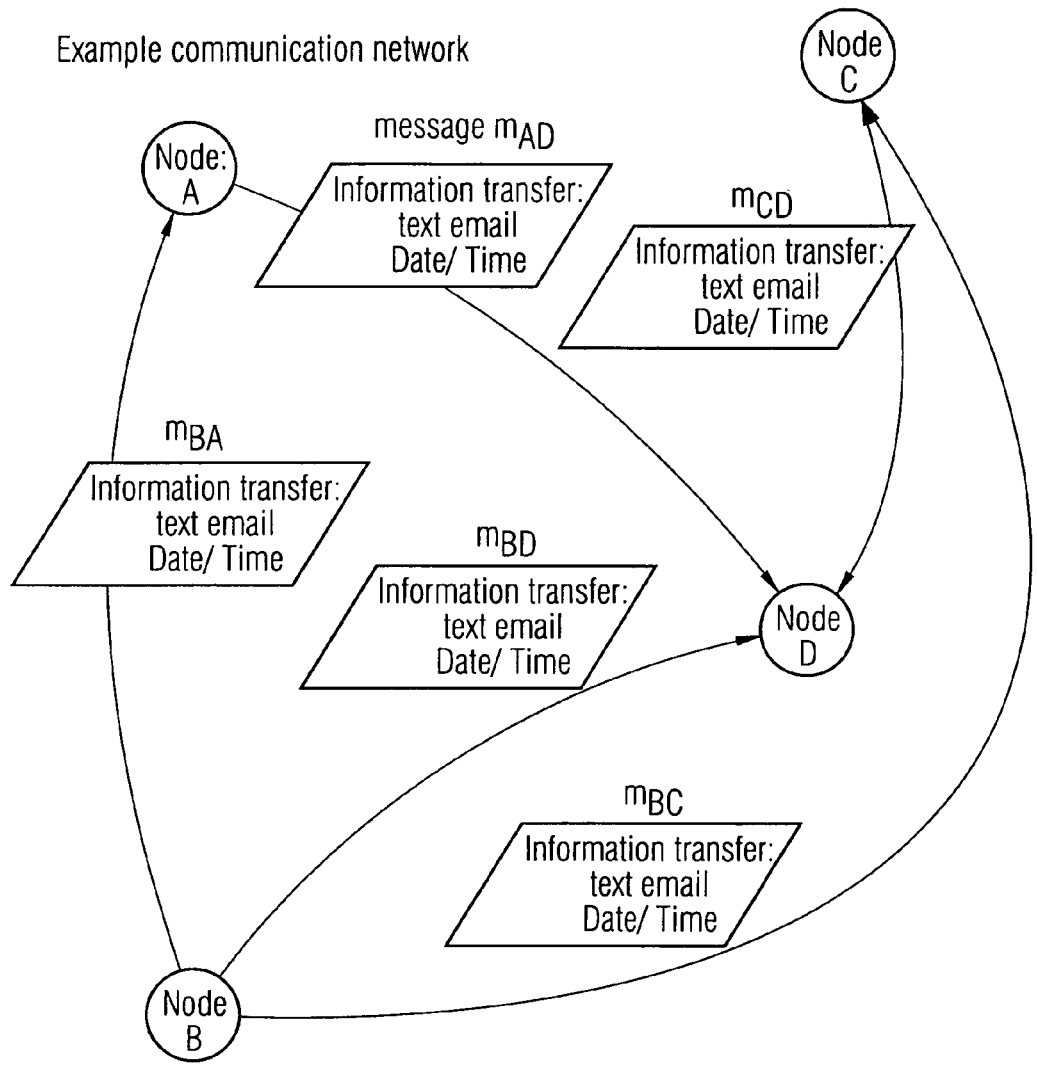
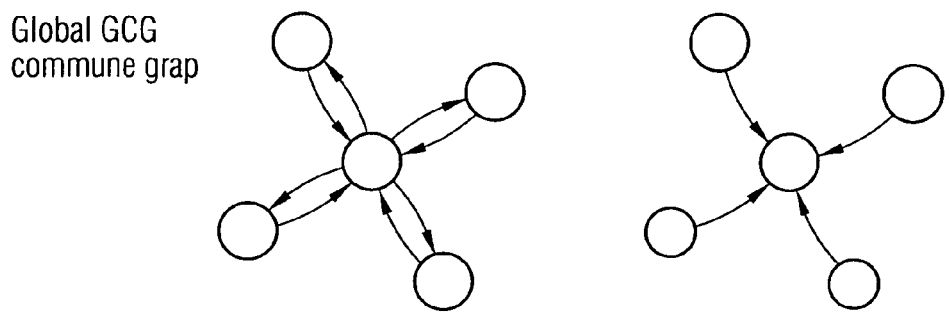
Global GCG
commune grap

METHOD AND AN APPARATUS FOR ANALYZING A COMMUNICATION NETWORK

FIELD OF THE INVENTION

The Invention relates to a method and an apparatus for analyzing a communication network comprising nodes communicating with each other via messages.

BACKGROUND OF THE INVENTION

Analysis of communication networks such as computer networks or social networks receives increasing attention in recent years. Networks as diverse as so those generated by email communication, instant messaging, link structure in the Internet as well as citation and collaboration networks need to be analyzed for better understanding of communication patterns, identifying roles of participants in the network and finding connections between different participants or nodes of the network or to find ways to propagate certain messages between nodes or participants of the network efficiently. A communication network is comprised of several nodes which exchange information via messages with each other. Transfer of messages can be either explicit, e.g. sending of emails, or implicit e.g. two or more participants commenting on a single blog entry. Communication networks comprise for example computer networks such as internal enterprise communication networks transferring emails between terminals connected to the network. These communication networks can also extend to customers and partners of the company wherein emails or letters are sent from one node or participant of the network to another participant. Publications written by multiple authors such as product specifications or manuals or articles are also exchanged as messages between nodes of a communication network. Further, there are communication networks of formal business agreements which are mostly in textual form. The communication in such a communication network usually spans over a long time period and is not concentrated on a single issue. In a typical communication network such as computer network of an enterprise multiple topics are touched concurrently by different participants discussing different topics at the same time.

Accordingly it is an object of the present invention to provide a method and an apparatus for analyzing efficiently a communication network.

This object is achieved by a method having the following features

The invention provides a method for analyzing a communication network comprising nodes communicating with each other via messages comprising the steps of:
(a) performing a topic discovery on the basis of a content of the messages;
(b) performing a segmentation of a global network graph representing the communication network into topic sub-graphs depending on the discovered topics; and
(c) calculating intra-topic network properties and inter-topic network properties of the nodes.

In an embodiment of the method according to the present invention a calculated network property is formed by centrality of a node.

In an embodiment of the method according to the present invention a calculated network property is formed by a prestige of a node.

In an embodiment of the method according to the present invention each method comprises at least an indication of the source node transmitting the message, an indication of a destination node receiving the message, and a message content.

In an embodiment of the method according to the present invention the message content is formed by a textual content or by multimedia data.

In an embodiment of the method according to the present invention the indication of a node is formed by a network address of the node or by a name of the node.

In an embodiment of the method according to the present invention the messages are transferred between the nodes via communication channels.

In an embodiment of the method according to the present invention the messages are transferred between the nodes via communication channels as electro-magnetic signals.

In an embodiment of the method according to the present invention the messages are transferred between the nodes as acoustic signals.

In an embodiment of the method according to the present invention the acoustic signals are converted by at least one microphone to corresponding electronic signals.

In an embodiment of the method according to the present invention the messages are transferred as data packets via a communication channel.

In an embodiment of the method according to the present invention the messages are formed by e-mails transferred via a communication channel.

In an embodiment of the method according to the present invention the messages exchanged between the nodes of the communication network are stored in a message list.

In an embodiment of the method according to the present invention performing the topic discovery comprises the steps of:
(a1) extracting keywords from the content of the messages to generate keyword vectors;
(a2) stemming of the extracted keywords and removing of stop words;
(a3) normalizing the generated keyword vectors using TF/IDF;
(a4) pruning the normalized keyword vectors;
(a5) performing a singular value decomposition to reduce the dimensionality of a keyword vector space; and
(a6) clustering messages having a similar message content in topic clusters.

In an embodiment of the method according to the present invention the messages of a topic cluster are combined during segmentation of the global network graph into a corresponding topic sub-graph.

In an embodiment of the method according to the present invention the clustering of the messages is performed by means of a DB-scan.

In an embodiment of the method according to the present invention the network is formed by a computer network.

In an embodiment of the method according to the present invention the network is formed by a social network.

The invention further provides an apparatus for analyzing a communication network comprising nodes communicating with each other via messages comprising:
(a) a topic discovery unit for performing a topic discovery on the basis of a message content of the messages;
(b) a segmentation unit for performing a segmentation of a global network graph representing the communication network into topic sub-graphs depending on the discovered topics; and
(c) a property calculation unit for calculating intra-topic network properties and inter-topic network properties of the nodes.

In an embodiment of the apparatus according to the present invention a detector is provided for detecting the messages exchanged between nodes of the communication network.

In an embodiment of the apparatus according to the present invention the detected messages are stored in a message list memory.

The invention further provides a data carrier (computer readable storage medium) for storing a computer program comprising instructions for performing a method for analyzing a communication network comprising nodes communicating with each other via messages comprising the steps of:

(a) performing a topic discovery on the basis of a content of the messages;

(b) performing a segmentation of a global network graph representing said communication network into topic sub-graphs depending on the discovered topics; and (c) calculating intra-topic network properties and inter-topic network properties of the nodes.

The invention further provides a data carrier for storing a computer program comprising instructions for performing a method for analyzing a communication network comprising nodes communicating with each other via messages comprising the steps of:

(a) performing a topic discovery on the basis of a content of the messages;

(b) performing a segmentation of a global network graph representing the communication network into topic sub-graphs depending on the discovered topics; and (c) calculating intra-topic network properties and inter-topic network properties of the nodes.

BRIEF DESCRIPTION OF THE FIGURES

In the following embodiments of the method and apparatus for analyzing a communication network according to the present invention are described with reference to the enclosed figures.

FIG. 5 shows an example for a network graph of a communication network as employed by the method and apparatus according to an embodiment of the present invention;

Figure 1:
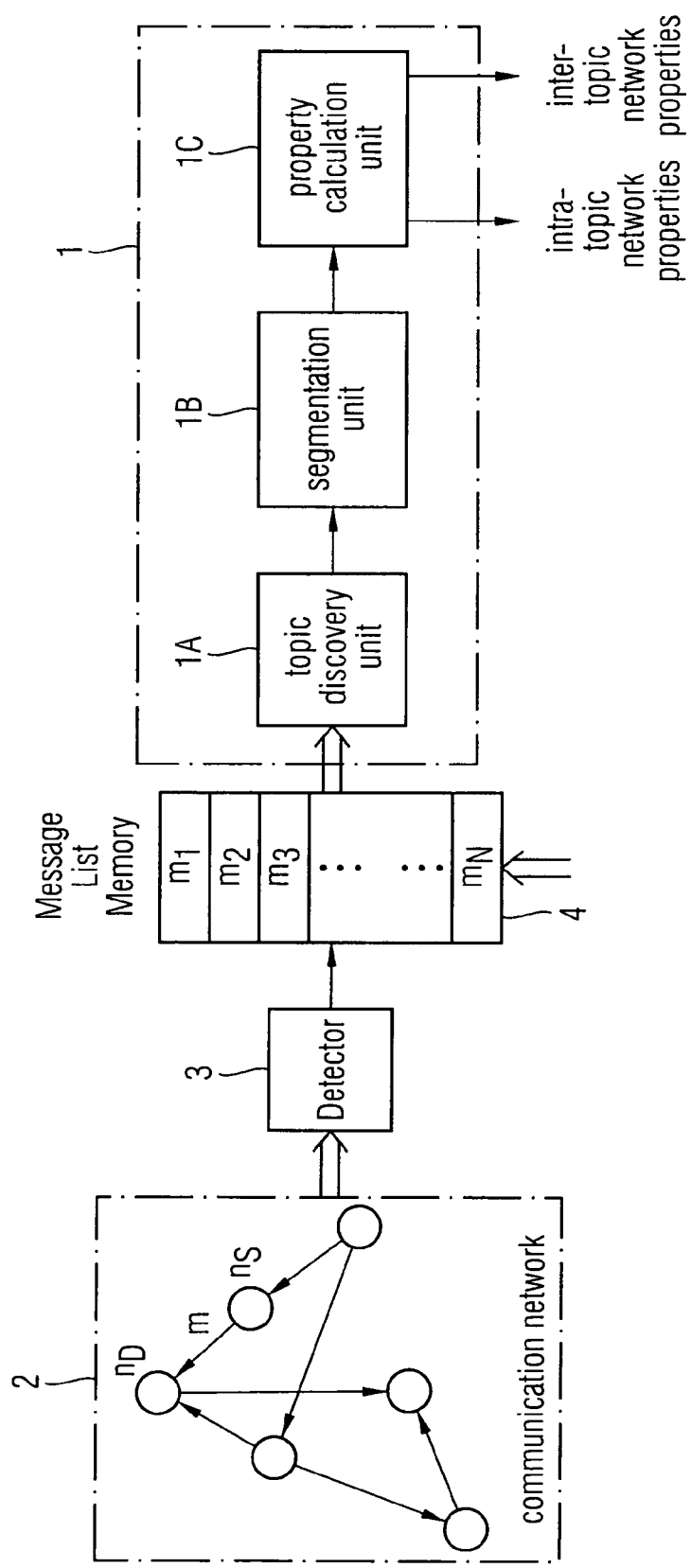
FIG. 1 shows a block diagram of a possible embodiment of an apparatus for analyzing a communication network according to the present invention.

As can be seen from FIG. 1 an apparatus 1 according to an embodiment of the present invention is provided for analyzing a communication network comprising nodes communicating with each other via messages m. The communication network comprises several nodes, wherein a source node $n_s$ sends a message m to a destination node $n_d$. A communication network 2 as shown in FIG. 1 can be any kind communication network, for example, a computer network or a social network. In a computer network the nodes are formed by devices such as bridges, routers or terminals. In a social network the nodes are participants participating in that social communication network. A communication network 2 can be represented by a global network graph as shown in FIG. 1. Each message m transmitted from a source node to a destination node comprises at least an indication of a source node transmitting the message, an indication of a destination node receiving the message and a message content. The message content can be formed by textual content or by multimedia data. The indication of a node can be either formed by a network address such as a computer network address of a computer network or by a name of that node. Messages m are transferred between the nodes of the communication network 2 via communication channels. The communication channels can be wireless communication channels or wired communication channels. In a possible embodiment the messages m are transferred between the nodes of the communication network 2 via communication channels as electromagnetic signals.

In an embodiment the messages m between the nodes of the communication network 2 are transferred between that nodes as acoustical signals. When the messages m are transferred between the nodes by acoustical signals these signals can be converted in a possible embodiment by at least one microphone into corresponding electronic signals. In an alternative embodiment the messages m of the communication network 2 are transferred as data packets via a communication channel. These data packets can have a header and payload data. The messages m can for example be formed by emails transferred via a communication channel from a source node to a destination node.

As shown in FIG. 1 a detector 3 can be provided which detects messages m exchanged between nodes of the communication network 2. The detected messages m are stored in a message list of a memory 4 as shown in FIG. 1. Each message m stored in the memory 4 comprises an indication of a source node, an indication of a destination node and a message content formed for example by a textual content or by multimedia data.

The apparatus 1 for analyzing the communication network 2 comprises in the embodiment shown in FIG. 1 a topic discovery unit 1A, a segmentation unit 1B and a property calculation unit 1C. The topic discovery unit 1A performed a topic discovery on the basis of a message content of the messages m stored in the memory 4. The segmentation unit 1B which is connected to the topic discovery unit 1A performs then a segmentation of a global network graph representing the communication network 2 in topic sub-graph depending on the discovered topics. The apparatus 1 as shown in FIG. 1 further comprises a property calculation unit 1C which calculates intra-topic network properties and inter-topic network properties of nodes n within the communication network 2.

Figure 2A:
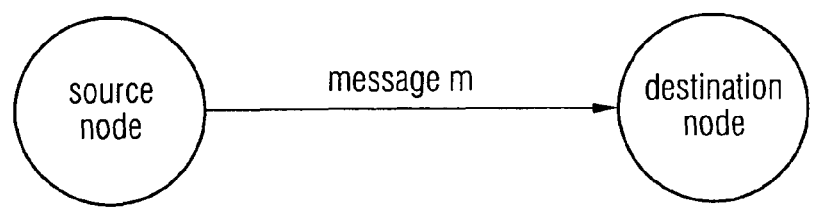
FIG. 2A shows an edge of a network graph as employed by a method and an apparatus according to the present invention.
Figure 2B:
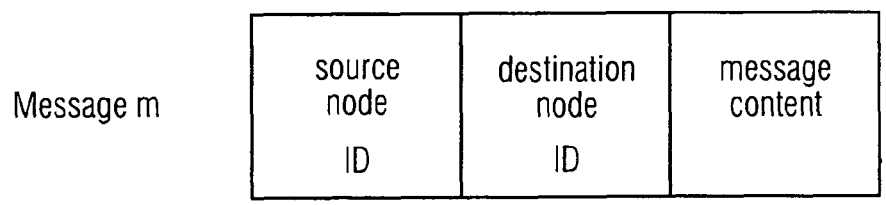
FIG. 2B shows a possible data format of a message exchanged via nodes according to possible embodiment of the method and apparatus according to the present invention.

FIG. 2A shows a part of a communication network graph having a source node $n_s$ and a destination node $n_D$. The source node $n_s$ sends a message m to a destination node $n_D$. In a possible embodiment the message m has a data structure as shown in FIG. 2B. Each message m comprises a source node ID of the source node, a destination node ID of the destination node and a message content.

Figure 3:
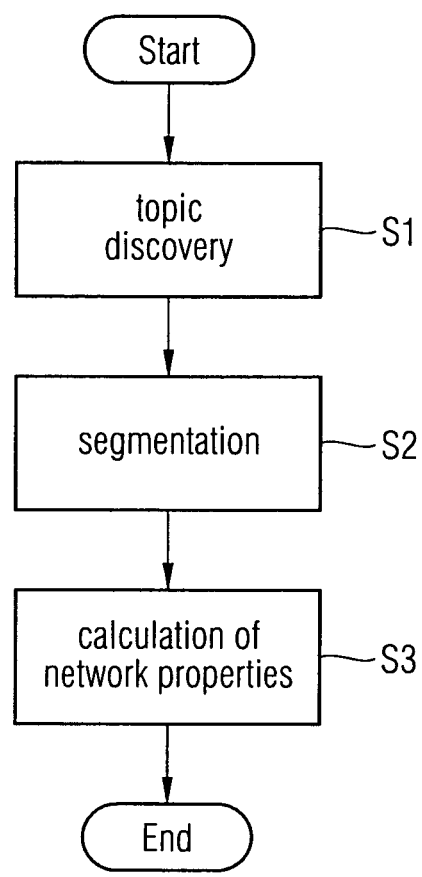
FIG. 3 shows a flowchart of an embodiment of the method for analyzing a communication network according to the present invention.

FIG. 3 shows a flowchart of an embodiment of the method for analyzing the communication network 2 performed by the apparatus 1 as shown in FIG. 1.

In a first step S1 the topic discovery unit 1A performs a topic discovery on the basis of the content of the messages m stored in the memory 4.

In a further step S2 the segmentation unit 1B performs a segmentation of the global network graph representing the communication network 2 into topic sub-graphs depending on the topics discovered by the topic discovery unit 1A.

In a further S3 the property calculation unit 1C calculates in the intra-topic network properties and the inter-topic network properties of the nodes n of the communication network 2. In a possible embodiment a calculated network property is formed by a centrality of a node n. In a further embodiment the calculated network property is formed by a prestige of a node n.

Figure 4:
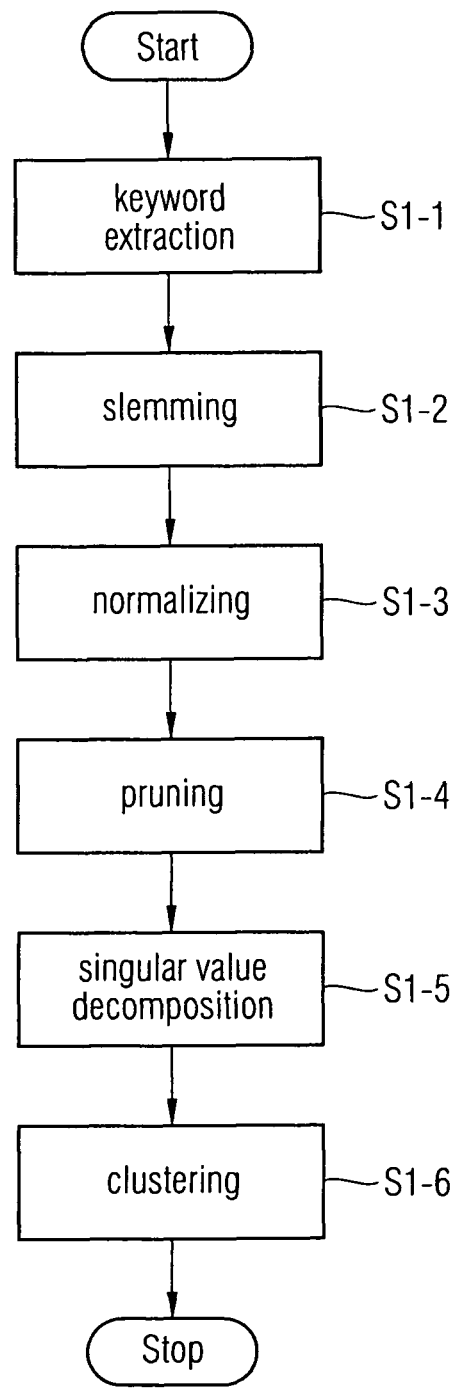
FIG. 4 shows a flowchart of performing of a topic discovery as employed in an embodiment of the method according to the present invention.

FIG. 4 shows a flowchart illustrating the topic discovery in step S1 in more details.

In a first step S1-1 keywords are extracted from the content of the stored messages m to generate key word vectors.

In a further step S1-2 the extracted keywords are stemmed and stopwords are removed.

In a further step S1-3 the generated keyword vectors are normalized using a TF/IDF.

In a further step S1-4 the normalized keyword vectors are pruned.

In a further step S1-5 a singular value decomposition is performed by the topic discovery unit 1A to reduce a dimensionality of a keyword vector space.

Finally in step S1-6 messages m having a similar message content are clustered in topic clusters.

In a possible embodiment the segmentation unit 1B combines the messages m of the topic cluster during segmentation of the global network graph into corresponding topic sub-graphs. In a possible embodiment the clustering of the message m can be performed by means of a DB-Scan.

FIG. 5 shows an example of a communication network 2 which can be analyzed by the method and apparatus according to the present invention. The given exemplary communication network 2 is represented by a global network graph having in the given example four nodes A, B, C, D. The nodes exchange messages m in text e-mails labeled with date and time of the e-mail. In the method and apparatus according to the present invention the content of the messages m exchanged between the nodes form the basis for analyzing the communication network 2 as shown in FIG. 5. The topic discovery unit 1A extracts and identifies topics based primarily on an unstructured content of the communication messages m exchanged between the nodes n of the communication network 2. In a possible embodiment the topic discovery unit 1A performs a topic discovery as illustrated by the flowchart of FIG. 4. The topic discovery unit 1A generates in a possible embodiment a list of all identified topics T and each communication message m is associated with one or more of these topics T.

For example a first topic $T_A$ can be a sport such as soccer. Employees of a company at terminals forming nodes of a computer network of the company exchange e-mails with each other having a content which is related to the topic $T_A$ "soccer". Another example for a topic $T_B$ might concern a project in which different employees of a company work. In the given example of FIG. 5 each communication message m is labeled with one or more topics T such as topics $T_A$ (soccer) and $T_B$ (project). For example the messages $m_{BD}$, $m_{AD}$ and $m_{BA}$ shown in FIG. 5 might concern topic $T_A$ (soccer) while the messages $m_{CD}$ and $m_{BC}$ concern the project, i.e. topic $T_B$.

Figure 6:
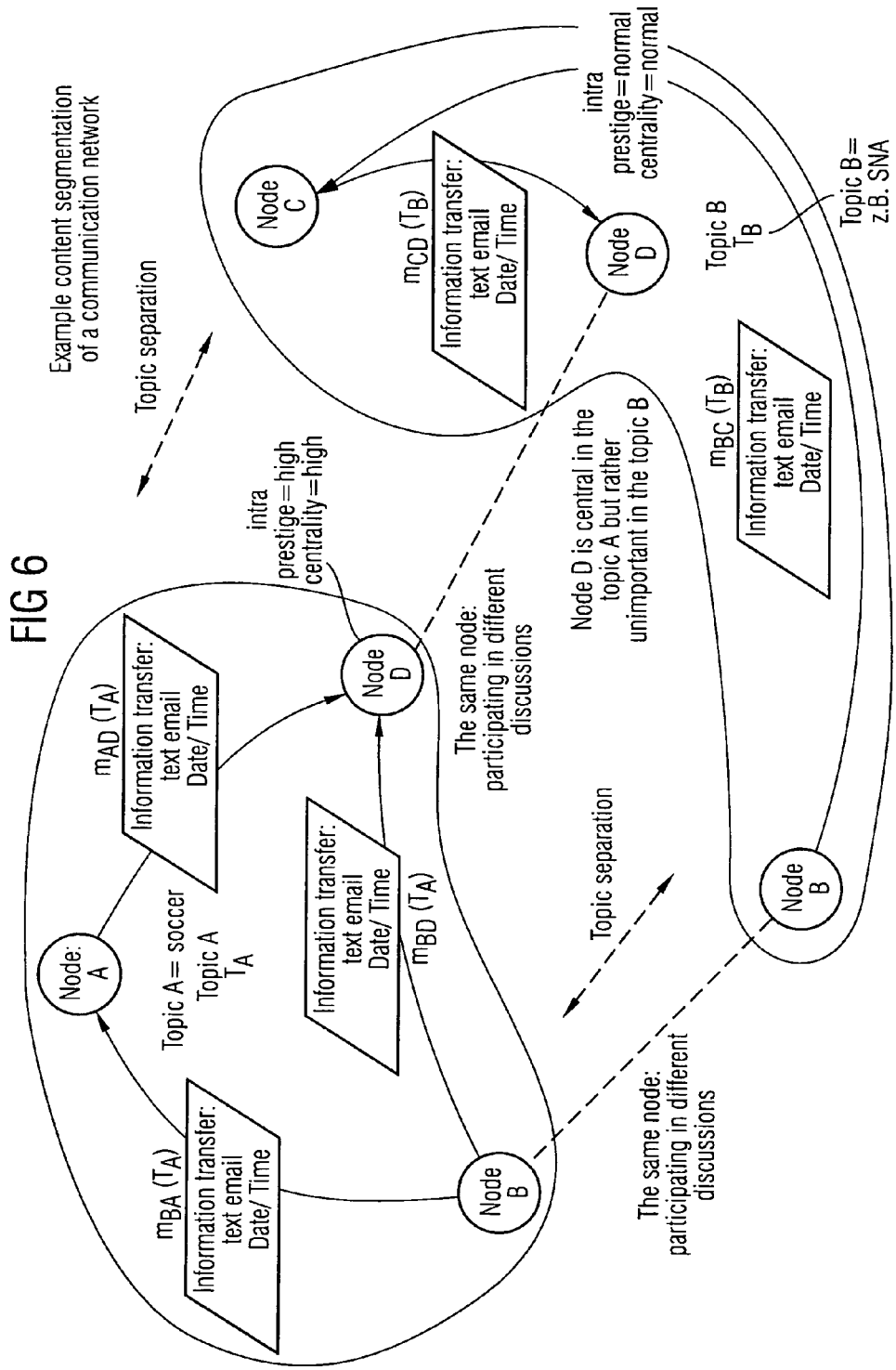
FIG. 6 shows the network graph of FIG. 5 segmented by the method apparatus according to the present invention.

The segmentation unit 1B of the apparatus 1 according to the present invention labels the messages m according to a list of all identified topics T and performs the segmentation of the global network graph as shown in FIG. 5 representing the communication network 2 into topic sub-graphs depending on the discovered topics T as shown in FIG. 6.

The global communication graph shown in FIG. 5 is segmented into potentially overlapping sub-graphs according to the results of the previous processing stage, i.e. the result of the topic discovery unit 1A. This is achieved by grouping messages m belonging to a particular topic T together and generating a communication sub-graph separately for each topic T.

Figure 7:
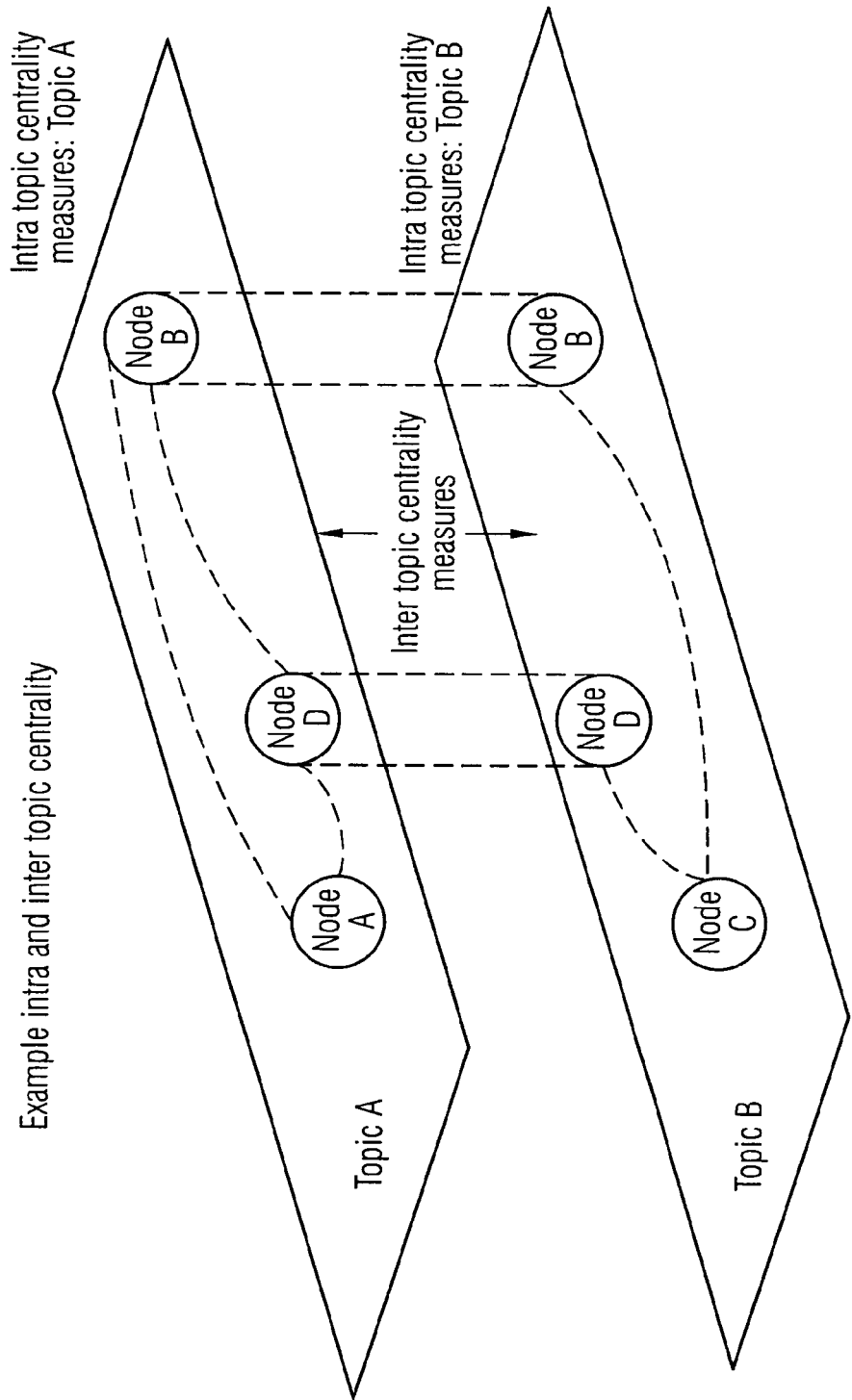
FIG. 7 shows the segmented network graph of a communication network for calculating the topic and inter-topic network properties according to an embodiment of the method and apparatus according to the present invention.

FIG. 6 shows an example of the topic network segmentation result. As can be seen from FIG. 6 nodes C, D of the communication network 2 participate in different discussions or different topics T. Both nodes B and node D exchange information about soccer (topic $T_a$) and about the project (topic $T_b$). This separation of topics T allows deeper insight and analyzing results of the communication network 2. For example as can be seen from FIG. 6 node D has a rather central position concerning topic $T_a$ (soccer) but is not important when it comes to topic $T_b$ (project). The direction of the messages m is also an indication of the importance or prestige of a node n with respect to a certain topic T. For instance node D is an important node when it concerns topic $T_a$ (soccer) because both nodes A, B of the group within this sub-graphs report to this node D via messages mAD and mBD. The property calculation unit 1C of the apparatus according to present invention as shown in FIG. 1 calculates automatically intra-topic network properties and inter-topic network properties of the nodes on the basis of the segmented communication network graph as shown in FIG. 7. For each topic such as topic $T_a$ (soccer) topic $T_b$ (project) an intra-topic analysis of the communication network 2 can be performed. Moreover, the property calculation unit 1C further calculates inter-topic network properties. Different network properties can be calculated using the additional information of topic relevance of the network nodes. The property calculation unit 1C calculates for example an inter-topic centrality of a network node proportionally to the number of sub-networks in which the respective node is a member of. For example, a node participating in the information exchange in many different segmented topic sub-graphs is more important than a node participating in the communication of only few topic sub-graphs.

Figure 8:
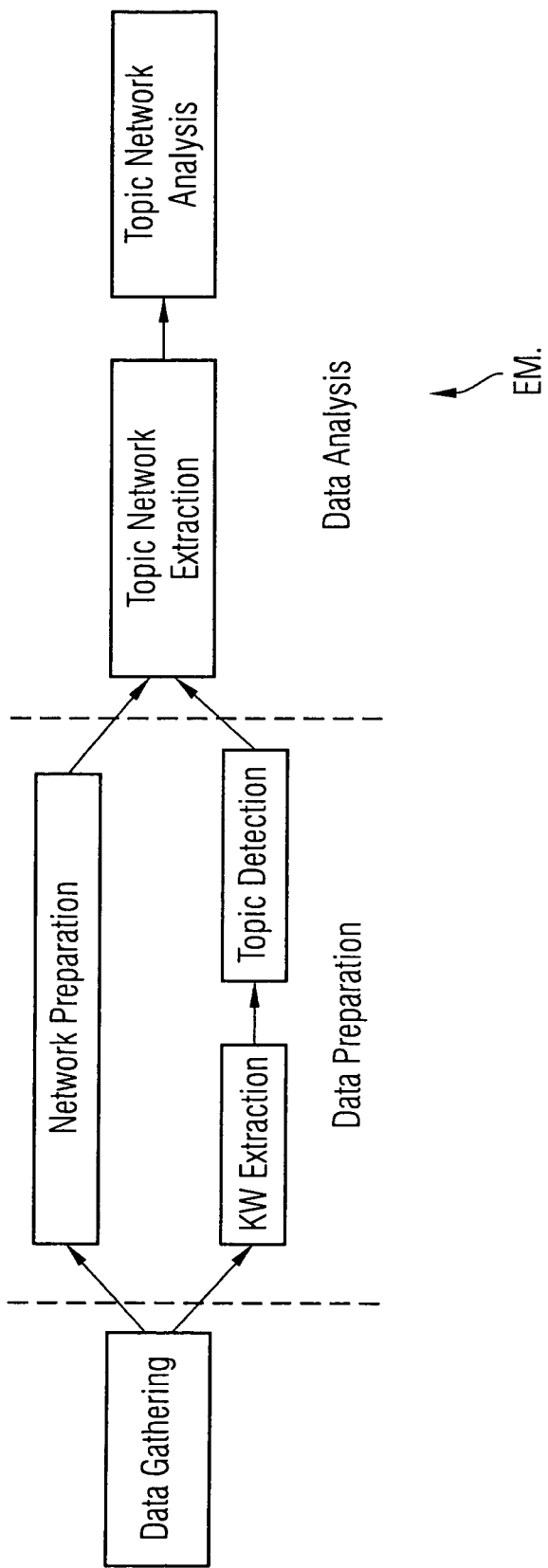
FIG. 8 shows a process chart for illustrating an embodiment of the method and apparatus according to the present invention.

FIG. 8 shows a process chart as an embodiment of the method for analyzing a communication network 2 according to the present invention. In a first stage data collection is performed. In this stage appropriate data is collected. In a second stage topics are extracted and identified based on the unstructured content of the communication messages m. In a further stage the topic segments are analyzed. The topic network extraction is performed wherein the global communication graph gets segmented into potentially overlapping sub-graphs by grouping messages m belonging to a particular topic T together and creating communication sub-graphs for each topic T as shown in FIG. 6. In the last stage a topic network analysis is performed. In an intra-topic network analysis network properties are calculated on the intra-topic level.

In an inter-topic level analysis different network properties are calculated using additional information a topic relevance of the respective network nodes. In this way, for example, network properties like centrality and prestige are extended by an additional dimension. An example can be an inter-topic centrality evaluation of network nodes calculated proportionally to the number of sub-networks to which the node belongs.

With the method and apparatus according to the present invention the content of communication is incorporated into the analysis of the communication network 2 such as a computer network or a social network. In an embodiment unstructured text content of messages m is incorporated into the analyzes of the communication network 2.

An automatic topic discovery leads to a soft segmentation of communication graphs so that a further analysis can be performed more effectively.

The calculation of communication graph properties like e.g. graph node centrality is performed separately for a topic related communication sub-graph.

Further graph properties like e.g. node's in centrality measures are calculated based on the unfolded graph view resulting from the segmentation with sharing of node among segmented sub-graphs as shown in FIG. 6. In particular, a calculation of inter-topic centrality and prestige measures like e.g. topic betweenness is performed. A node participating in the communication of many different topics forms an allrounder being important in the communication network 2.

With the method and apparatus according to the present invention a deeper understanding of the communication network 2 can be achieved. It is possible to understand communication patterns to identify roles of participants. Furthermore it is possible to find connections between different participants and better ways to propagate certain messages m in the network 2. The information can further be utilized for analysis of an internal communication of an enterprise to optimize the organization of the enterprise. It is also possible is to support marketing and communication activities of a company. For example, the method and apparatus according to the present invention can help to find efficient sales channels and sales connections. Moreover it is possible to use the method and apparatus according to the present invention to investigate illegal or not compliant activities within an organization.

The method and apparatus according to the present invention allows deeper insights in communication activities due to incorporation of communication content in the analyzing process. In particular, the method and apparatus allows to consider a communication sub-graph focus on a particular topic T to analyze the properties as well as properties of connections between these sub-graphs. With the method and system according to the present invention one can identify network properties which are not visible from a global perspective. For example it is possible to identify an expert important to a particular topic T which otherwise is invisible in the whole graph. Furthermore it is possible to spot employees with a broad range of knowledge.

The invention claimed is:

1. A method for analyzing a communication network comprising nodes communicating with each other via messages, the method comprising:
    detecting messages that are exchanged between the nodes of said communication network;
    storing said messages in a message list memory;
    identifying communication links within the network, each communication link being identified between a source node and a destination node if and only if a message has travelled on the link from the source node to the destination node;
    for each message that has been stored in the message list memory, identifying a content of the message;
    performing a topic discovery on the basis of the content of all of said messages;
    performing a segmentation of a global network graph representing said communication network into topic subgraphs depending on the discovered topics, each subgraph including at least two nodes and the communication link connecting the nodes;
    calculating intra-topic network properties of the nodes within their respective sub-graphs; and
    calculating inter-topic network properties of the nodes with regard to all sub-graphs by calculating an intertopic centrality of each node proportionally to a number of sub-graphs to which the respective node is a member of.

2. The method according to claim 1, wherein a calculated network property is formed by a centrality of a node.

3. The method according to claim 1, wherein a calculated network property is formed by a prestige of a node.

4. The method according to claim 1, wherein each message comprises at least an indication of the source node transmitting said message, an indication of the destination node receiving said message, and a message content.

5. The method according to claim 4, wherein the message content is formed by a textual content or by multi media data.

6. The method according to claim 4, wherein said indication of a node is formed by a network address of said node or by a name of said node.

7. The method according to claim 1, wherein said messages are transferred between said nodes via communication channels.

8. The method according to claim 7, wherein the communication channels are wireless communication channels or wired communication channels.

9. The method according to claim 8, wherein said messages are transferred between the nodes via communication channels as electro-magnetic signals.

10. The method according to claim 8, wherein said messages are transferred between said nodes as acoustic signals.

11. The method according to claim 10, wherein the acoustic signals are converted by at least one microphone to corresponding electronic signals.

12. The method according to claim 7, wherein said messages are transferred as data packets via a communication channel.

13. The method according to claim 7, wherein the messages are formed by e-mails transferred via a communication channel.

14. The method according to claim 1, wherein the messages exchanged between the nodes of said communication network are stored in a message list.

15. The method according to claim 1, wherein performing said topic discovery comprises:
    extracting keywords from the content of the messages to generate key word vectors;
    stemming of the extracted keywords and removing of a stop words;
    normalizing the generated keyword vectors using Term Frequency—Inverse Document Frequency (TF/IDF);
    pruning the normalized keyword vectors;
    performing a singular value decomposition to reduce the dimensionality of a keyword vector space; and
    clustering messages having a similar message content in topic clusters.

16. The method according to claim 15, wherein the messages of a topic cluster are combined during segmentation of said global network graph into a corresponding topic subgraph.

17. The method according to claim 15, wherein the clustering of the messages is performed based on a Density-Based Spatial Clustering of Applications with Noise (DB-scan).

18. The method according to claim 1, wherein said network is formed by a computer network.

19. The method according to claim 1, wherein said network is formed by a social network.

20. An apparatus for analyzing a communication network comprising nodes communicating with each other via messages, comprising:
- a detector to detect messages that are exchanged between the nodes of said communication network;
- a message list memory to store the messages;
- a topic discovery unit to identify a content of each message and to perform a topic discovery on the basis of the content of all messages;
- a segmentation unit to identify communication links within the network, each communication link being identified between a source node and a destination node if and only if a message has travelled on the link from the source node to the destination node, and to perform a segmentation of a global network graph representing said communication network into topic sub-graphs depending on the discovered topics, each sub-graph including at least two nodes and the communication link connecting the nodes; and
- a property calculation unit for calculating intra-topic network properties of the nodes within their respective sub-graphs and for calculating inter-topic network properties of the nodes with respect to all sub-graphs by calculating an inter-topic centrality of each node proportionally to a number of sub-graphs to which the respective node is a member of.

21. A non-transitory computer readable storage medium storing a program to control a computer to perform a method for analyzing a communication network comprising nodes communicating with each other via messages, the method comprising:
- for each message, identifying a content of the message;
- performing a topic discovery on the basis of the content of said messages;
- identifying communication links within the network, each communication link being identified if and only if a message has travelled between users on the link;
- performing a segmentation of a global network graph representing said communication network into topic sub-graphs by segmenting the communication links depending on the discovered topics;
- calculating intra-topic network properties within each sub-graph; and
- calculating inter-topic network properties between the sub-graphs by calculating an inter-topic centrality of each node proportionally to a number of sub-graphs to which the respective node is a member of.

* * * * *